(12) United States Patent
Oshima et al.

(10) Patent No.: US 8,839,896 B2
(45) Date of Patent: Sep. 23, 2014

(54) SADDLE TYPE VEHICLE WITH REGULATOR DISPOSED BELOW FUEL TANK

(75) Inventors: Tadashi Oshima, Saitama (JP);
Hironori Nozawa, Saitama (JP); Shuto Higashizuru, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 246 days.

(21) Appl. No.: 13/446,121

(22) Filed: Apr. 13, 2012

(65) Prior Publication Data

US 2012/0261203 A1   Oct. 18, 2012

(30) Foreign Application Priority Data

Apr. 15, 2011   (JP) ................................ 2011-091507

(51) Int. Cl.
*B62J 37/00* (2006.01)
*B62K 25/28* (2006.01)
*B62K 11/04* (2006.01)

(52) U.S. Cl.
CPC ............... *B62J 37/00* (2013.01); *B62K 25/283* (2013.01); *B62K 11/04* (2013.01)
USPC ........................... 180/69.4; 180/219; 180/291

(58) Field of Classification Search
CPC ............ B62J 37/00; B62J 35/00; B62M 7/02; B62M 7/04; B62M 7/06; B62K 11/00
USPC .......................... 180/69.4, 219, 291; 123/509
See application file for complete search history.

(56) References Cited

U.S. PATENT DOCUMENTS

| 4,413,700 | A  | * | 11/1983 | Shiratsuchi | .................... 180/219 |
| 7,370,625 | B2 | * | 5/2008  | Hanafusa | .................. 123/198 R |
| 7,484,767 | B2 | * | 2/2009  | Tsuya | ............................ 280/835 |
| 7,588,009 | B2 | * | 9/2009  | Kurokawa et al. | ......... 123/193.5 |
| 7,730,987 | B2 | * | 6/2010  | Okuma et al. | ................ 180/219 |
| 7,766,115 | B2 | * | 8/2010  | Kato et al. | ..................... 180/219 |
| 7,905,506 | B2 | * | 3/2011  | Ishikawa et al. | .............. 280/291 |
| 2009/0242300 | A1 | * | 10/2009 | Mizukura et al. | ............ 180/69.4 |
| 2009/0242312 | A1 | * | 10/2009 | Oshima et al. | ................ 180/312 |
| 2010/0061058 | A1 | * | 3/2010  | Tanabe et al. | ................ 361/690 |

FOREIGN PATENT DOCUMENTS

JP   2010-195283 A   9/2010

* cited by examiner

*Primary Examiner* — Katy M Ebner
(74) *Attorney, Agent, or Firm* — Carrier Blackman & Associates, P.C.; William D. Blackman; Joseph P. Carrier

(57) ABSTRACT

A saddle type vehicle includes a vehicle body frame with an engine and a seat supported on the vehicle body frame, a fuel tank disposed below the seat for storing fuel for the engine, a fuel pump disposed at a lower portion of the fuel tank for supplying the fuel to the engine, a regulator disposed below the fuel tank, a heat guard member disposed between the regulator and the fuel pump for blocking heat transfer, and a rear fender disposed below the regulator. By this structure the fuel tank need not be swollen downwardly by a great amount, and shaping of the fuel tank is facilitated.

12 Claims, 9 Drawing Sheets

SADDLE TYPE VEHICLE WITH REGULATOR DISPOSED BELOW FUEL TANK

TECHNICAL FIELD

This invention relates to a saddle type vehicle such as a motorcycle, and particularly to a saddle type vehicle wherein a regulator is disposed below a fuel tank.

BACKGROUND ART

As a conventional example, a motorcycle is known wherein a fuel tank is disposed below a seat and is swollen downwardly by a great amount at a lower portion thereof to form a lower swollen portion, in which a fuel pump is disposed while a regulator is disposed rearwardly of the lower swollen portion (refer to Patent Document 1). The motorcycle is an example of a saddle type vehicle.

According to such a structure as described above, lower disposition of the center of gravity can be achieved by disposing the fuel tank at a position as low as possible. Further, even if the temperature of the regulator becomes high, since traveling wind flows from the front to the rear, it is possible to reduce by an utmost extent transmittal of an influence of heat to the fuel pump.

PATENT DOCUMENT 1

Japanese Patent Laid-Open No. 2010-195283

PROBLEM TO BE SOLVED BY THE INVENTION

In the conventional structure, as the volume of the lower swollen portion of the fuel tank increases, deeper drawing of the lower face of the tank is required, and therefore, there is an issue that presswork becomes difficult. Accordingly, a disposition structure is demanded which eliminates the necessity to make the lower swollen portion of the fuel tank comparatively great while achieving lower disposition of the center of gravity similar to that of the conventional structure, while still preventing an influence of heat of the regulator upon the pump.

SUMMARY OF THE INVENTION

The present invention solves the issue described above and an object of the invention resides in achievement of lower disposition of the center of gravity similar to that of the conventional example and prevention of an influence of heat of a regulator on a pump without the necessity to deepen drawing of a lower swollen portion of a fuel tank.

In order to fulfill the above object and solve the issue described above, according to a first aspect of the invention as set forth in claim 1, there is provided a saddle type vehicle comprising:

a vehicle body frame with an engine and a seat supported on the vehicle body frame;

a fuel tank disposed below the seat for storing fuel for the engine;

a fuel pump disposed at a lower portion of the fuel tank for supplying the fuel to the engine;

a regulator disposed below the fuel tank;

a heat guard member for blocking heat transfer disposed between the regulator and the fuel pump; and a rear fender disposed below the regulator.

According to a second aspect of the invention, in addition to the first aspect, the saddle type vehicle is configured such that the vehicle body frame includes a pair of left and right seat rails extending obliquely upwardly rearwards for supporting the seat thereon;

a seat rail side cross member is provided between the left and right seat rails;

the regulator is attached to the seat rail side cross member and disposed in an inclined relationship along the seat rails (in an exemplary embodiment of the invention discussed below, portions corresponding to back stays 9 which configure the seat rails) as viewed in side elevation;

the heat guard member includes a swollen portion projecting downwardly toward the regulator, a bottom part of the swollen portion being formed so as to extend in a direction along the inclination of the regulator and partly project forwardly;

a discharge port (which corresponds to a discharge pipe 43 in the exemplary embodiment) of the fuel pump being disposed in the swollen portion.

According to a third aspect of the invention, in addition to the first aspect, the saddle type vehicle is configured such that an exhaust heat path aperture (which corresponds to an aperture 29 in the exemplary embodiment) is provided on a rear portion side of the regulator in the rear fender; and the exhaust heat path aperture is disposed forwardly of a rear wheel of the vehicle.

According to a fourth aspect of the invention, in addition to the first aspect, the saddle type vehicle is configured such that the saddle type vehicle supports a rear wheel for rotation at a rear portion thereof and includes a rear swing arm supported for rocking motion on the vehicle body frame (in the exemplary embodiment, a portion corresponding to the pivot frames 7 which configure the vehicle body frame) and a cushion unit for connecting the rear swing arm and the vehicle body frame to each other;

the vehicle body frame includes a pair of left and right pivot frames and a pivot side cross member connecting the left and right pivot frames to each other;

an upper attachment portion of the cushion unit is provided on the pivot side cross member;

the heat guard member extends forwardly farther than the fuel pump; and a cross member side attachment portion (which corresponds to a bridge portion 34 in the exemplary embodiment) for being engaged with the pivot side cross member is provided on the heat guard member.

According to a fifth aspect of the invention, in addition to the fourth aspect, the saddle type vehicle is configured such that the heat guard member includes a forward extension extending forwardly farther than the cross member side attachment portion;

an electrical component accommodation section which projects downwardly and has an electrical component accommodated therein is provided on the forward extension.

According to a sixth aspect of the invention, in addition to the fifth aspect, the saddle type vehicle is configured such that part of a front wall of the electrical component accommodation section forms a lid for opening and closing movement through a resin hinge section, while a projection for holding down the electrical component and a lid side locking portion (which corresponds to a pawl 67 in the exemplary embodiment) for locking an edge portion of the front wall positioned on the opposite sides of the lid are integrally formed on the lid.

According to a seventh aspect of the invention, in addition to the first aspect, the saddle type vehicle is configured such that the fuel pump is connected to a fuel hose (which corresponds to a feed hose 44 in the exemplary embodiment) for supplying fuel to the engine; and a hose guide portion for guiding the fuel hose is provided on an upper face of the heat guard member.

According to an eighth aspect of the invention, in addition to the seventh aspect, the saddle type vehicle is configured such that the hose guide portion is disposed on one side in a vehicle widthwise direction of an upper face of the heat guard member; and a harness guide portion for wiring of a harness connected to the regulator is provided on the other side in the vehicle widthwise direction of the upper face of the heat guard member.

According to a ninth aspect of the invention, in addition to the eighth aspect, the saddle type vehicle is configured such that a cutout portion through which wire of the harness to the regulator extends is provided on an outer side of the heat guard member in the vehicle widthwise direction with respect to and forwardly of the regulator.

EFFECTS OF THE INVENTION

With the first aspect of the invention, by disposing the regulator below the fuel pump positioned at a lower portion of the fuel tank, lower disposition of the center of gravity can be achieved and the influence of heat of the regulator on the fuel pump can be suppressed by the heat guard member. Further, adhesion of muddy water to the regulator is suppressed by the rear fender and heat radiation can be maintained readily. Also, different from the conventional technique, since a large downwardly swollen portion need not be provided on the bottom part of the fuel tank whereby the swelling amount in a downward direction can be made so as to be comparatively small, deep drawing need not be carried out and fabrication of the fuel tank of the invention is facilitated.

With the second aspect of the invention, since the regulator is attached to the seat rail side cross member provided between the left and right seat rails, the regulator can be supported firmly with a simple configuration and the discharge port of the fuel pump can be disposed utilizing a space configured by inclination disposition of the regulator.

With the third aspect of the invention, since the exhaust heat path is provided on the rear side of the regulator on the rear fender and is disposed forwardly of the rear wheel, high-temperature air around the regulator can be sucked out utilizing wind generated by rotation of the rear wheel and the cooling efficiency of the regulator can be enhanced.

With the fourth aspect of the invention, since the heat guard member extends forwardly farther than the fuel pump and the cross member side attachment portion engaged with the pivot side cross member is provided on the heat guard member, the heat guard member can be attached to the pivot side cross member with a simple configuration and the fuel pump and the regulator can be disposed in the proximity of each other with the heat guard member interposed therebetween. Consequently, favorable concentration of the vehicle's mass by disposition of the parts in the proximity of each other can be realized.

With the fifth aspect of the invention, since the electrical component accommodation section which projects downwardly is provided in the forward extension of the heat guard member and has an electrical component accommodated therein, further lower disposition of the vehicle's center of gravity, further concentration of the vehicle's mass and further reduction of the number of parts can be realized.

With the sixth aspect of the invention, since the lid for opening and closing movement is provided integrally on the front wall of the electrical component accommodation section through the resin hinge portion, even if the electrical part accommodation section is formed by deep drawing, it can be shaped integrally with the heat guard member. Additionally, since the projection for holding down the electrical component is provided on the lid, the electrical component can be held down accurately only by one part (the lid).

With the seventh aspect of the invention, since the hose guide portion for guiding the fuel hose is provided on the upper face of the heat guard member, the fuel hose can be properly piped while being guided to the prescribed position even if the space is narrow.

With the eighth aspect of the invention, since the hose guide portion is provided on the one side in the vehicle widthwise direction of the upper face of the heat guard member and the harness guide portion for wiring of the harness connected to the regulator is provided on the other side of the upper face, the fuel hose and the harness can be properly piped and wired separately from each other even if the space is narrow.

With the ninth aspect of the invention, since the cutout portion through which wiring of the harness to the regulator side extends is provided on the heat guard member on the outer side in the vehicle widthwise direction with respect to and forwardly of the regulator, the harness can be properly wired to the regulator while a heat shielding effect of the regulator is assured.

DETAILED DESCRIPTION OF MODE FOR CARRYING OUT THE INVENTION

In the following, an exemplary embodiment of the present invention is described with reference to the drawings.

Figure 1:
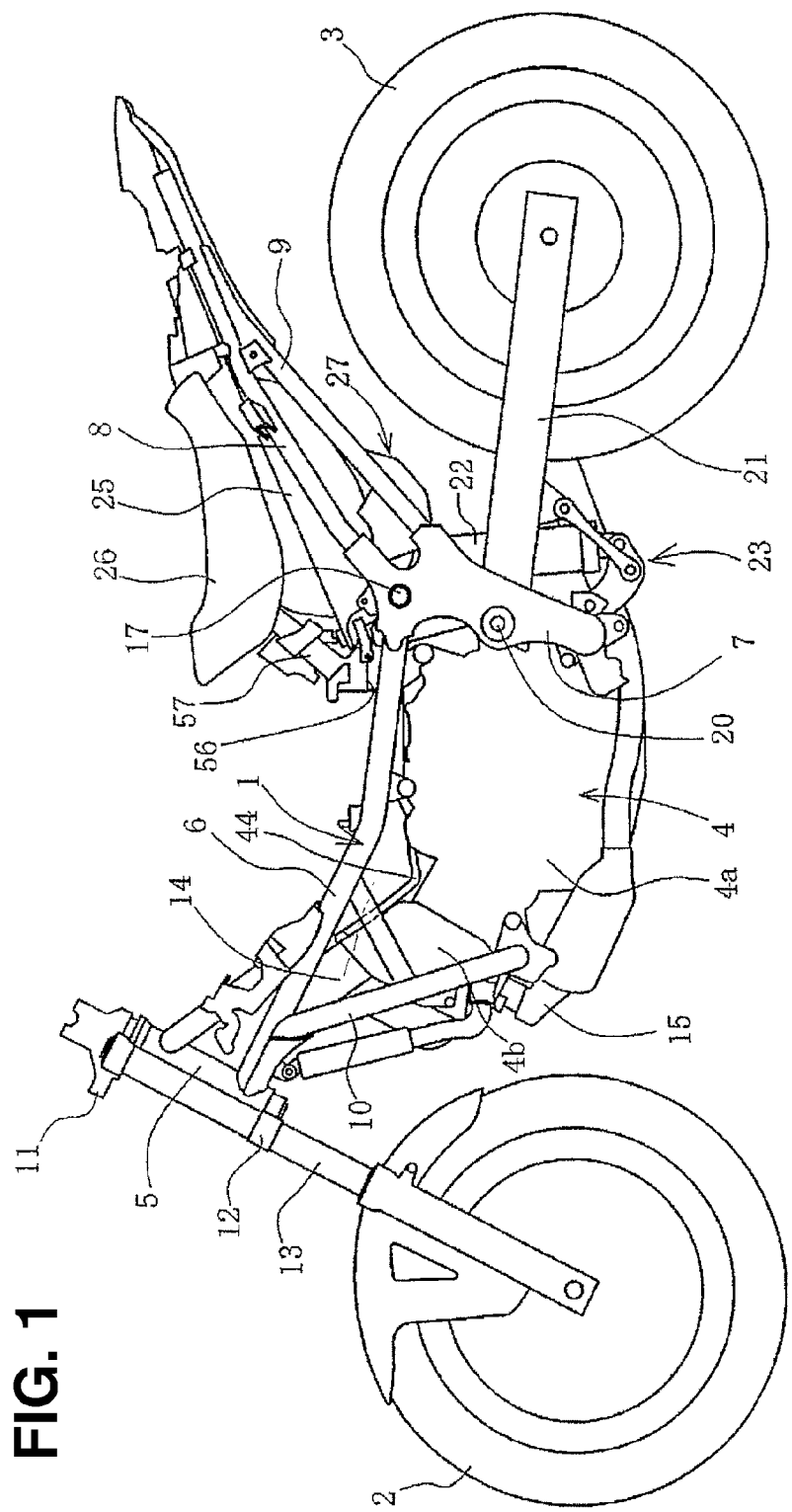
FIG. 1 is a side elevational view of a motorcycle according to an exemplary embodiment of the present invention.

FIG. 1 is a side elevational view of a motorcycle. The motorcycle is an example of a saddle type vehicle according to the present embodiment. It is to be noted that, in the following description, the forward and backward, upward and downward, and leftward and rightward directions are represented with reference the vehicle.

In this motorcycle, a front wheel 2 and a rear wheel 3 are supported at forward and rearward portions of a vehicle body frame 1, and an engine 4 is disposed between the front wheel 2 and the rear wheel 3 and supported on the vehicle body frame 1. The vehicle body frame 1 includes a head pipe 5 provided at a front end thereof, a pair of left and right main frames 6 extending upwardly and rearwardly of the engine 4 from the head pipe 5, a pair of left and right pivot frames 7 coupled to rear end portions of the main frames 6 and extending in upward and downward directions, a pair of left and right seat rails 8 extending obliquely upwardly rearwards from upper end portions of the pivot frames 7, a pair of left and right back stays 9 disposed below the seat rails 8 for connecting the pivot frames 7 and the seat rails 8 to each other, and a pair of left and right down frames 10 extending obliquely downwardly rearwards from front end portions of the main frames 6 in front of the engine 4.

The back stays 9 are members for reinforcing the seat rails 8. In a broad sense, the back stays 9 configure one seat rail including the seat rails 8. While the term seat rail in the claims is used in a broad sense, in the description of the embodiment, it is used in a narrow sense.

The head pipe 5 supports a pair of left and right front forks 13 for pivotal motion through a top bridge 11 and a bottom bridge 12.

The front wheel 2 is supported for rotation at a lower end portion of the front forks 13 and is steered by a handle bar (not shown) attached to the top bridge 11.

The engine 4 is of the water-cooled four-cylinder type and includes a crankcase 4a and a forwardly inclined cylinder section 4b. Air is taken in through a throttle body 14 disposed above the cylinder section 4b while gas is exhausted from an exhaust pipe 15 extending from the front face.

The exhaust pipe 15 is piped in the forward and rearward direction below the crankcase 4a and connects to a muffler (not shown) disposed on the right side of the rear wheel 3.

The pivot frames 7 support a front end of a rear swing arm 21 for rocking motion by means of a pivot shaft 20. The rear wheel 3 is supported for rocking motion at a rear end of the rear swing arm 21. The rear wheel 3 is driven through a chain by the engine 4.

A cushion unit 22 is provided between an intermediate portion in the forward and backward direction of the rear swing arm 21 and the vehicle body frame 1. The cushion unit 22 is supported at an upper end portion thereof by a pivot side cross member 17 provided at an upper portion of the pivot frames 7.

The pivot side cross member 17 is a reinforcing member for connecting upper portions of the left and right pivot frames 7 to each other.

The cushion unit 22 is supported at a lower portion thereof by a link mechanism 23. The link mechanism 23 is connected to a lower portion of the pivot frames 7 and a lower face of a front portion of the cushion unit 22.

A fuel tank 25 is supported and accommodated at a lower portion thereof between the left and right seat rails 8, and a seat 26 is disposed above the fuel tank 25. The fuel tank 25 is disposed in an inclined relationship such that, when it is viewed in side elevation, the fuel tank 25 extends obliquely upwardly rearwards substantially along the seat rails 8 and is formed long in the forward and backward direction such that a front end portion thereof is positioned in the proximity of the pivot side cross member 17 and a rear end portion thereof is positioned above a top portion of the rear wheel 3. The rear end portion of the fuel tank 25 extends rearwardly farther than the seat 26, and a fill opening (not shown) is provided here.

A rear fender 27 is provided between the left and right back stays 9 such that it covers the fuel tank 25 from below and covers the rear wheel 3 from above.

Figure 2:
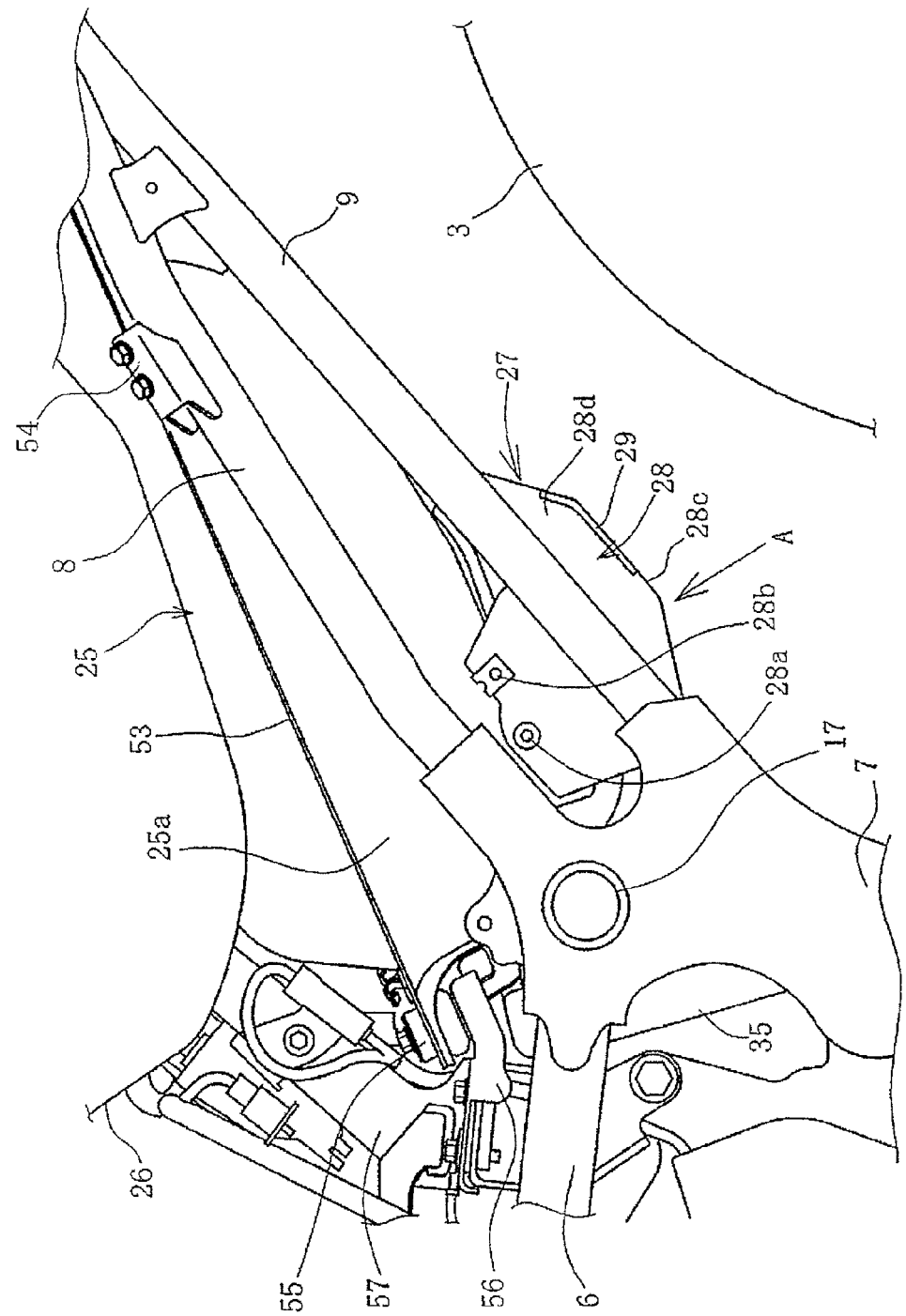
FIG. 2 is an enlarged side elevational view of a region of the motorcycle of FIG. 1 in the proximity of an upper portion of a pivot frame.
Figure 3:
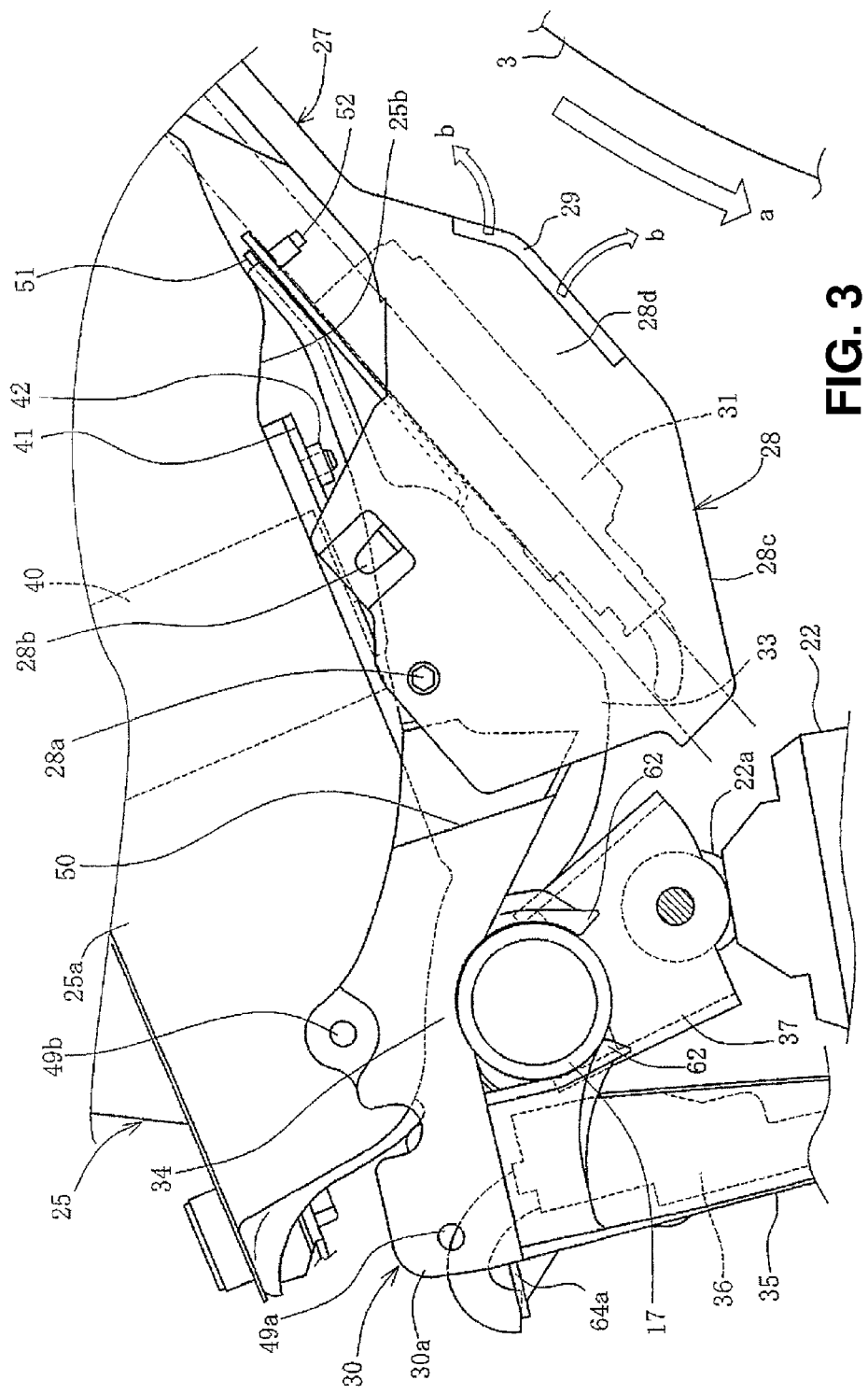
FIG. 3 is a partial further enlarged side elevational view partly in section of the region in FIG. 2.
Figure 4:
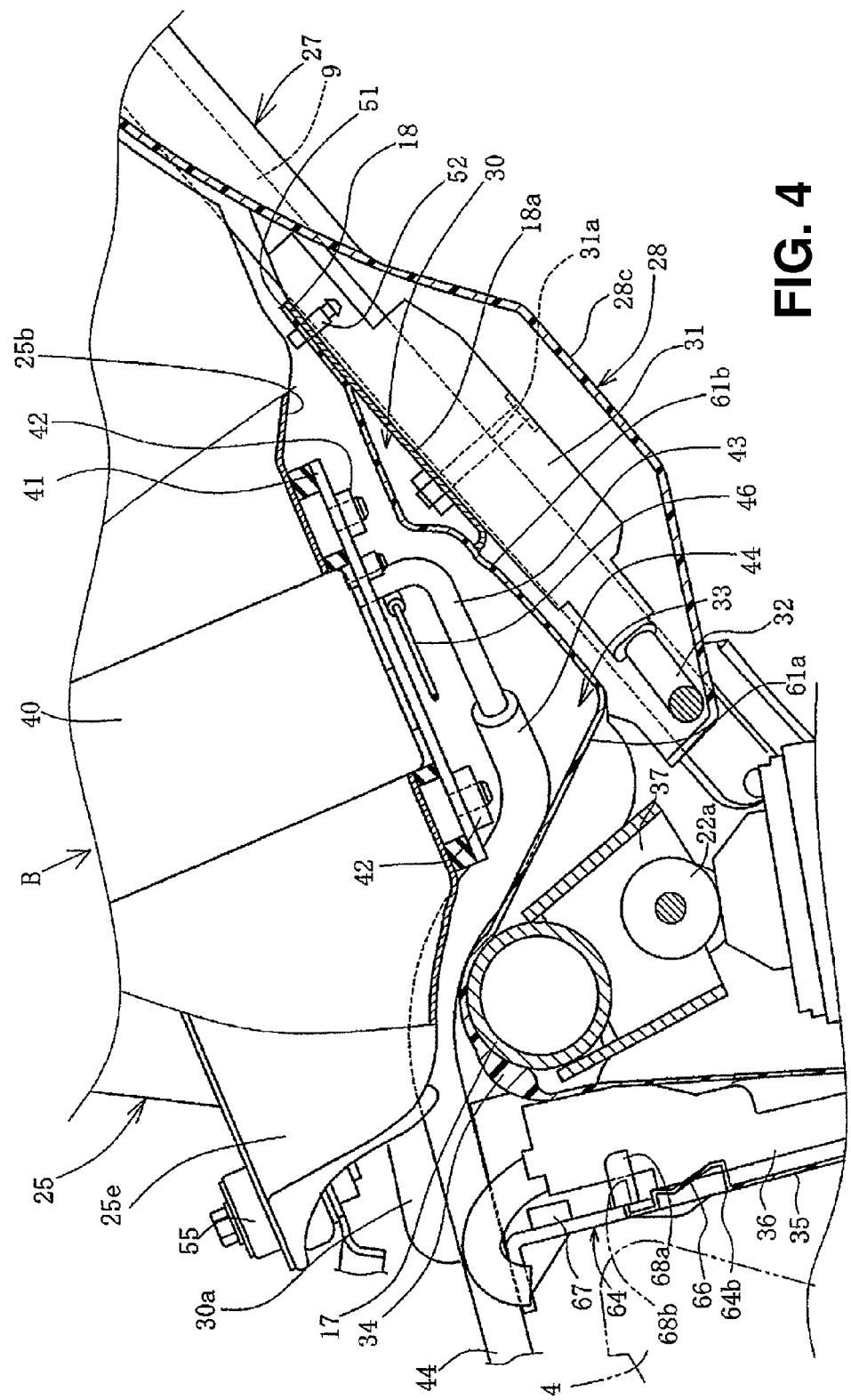
FIG. 4 is a sectional view taken along the center of a vehicle body of the motorcycle of FIG. 1 showing a similar range to that of FIG. 2.
Figure 5:
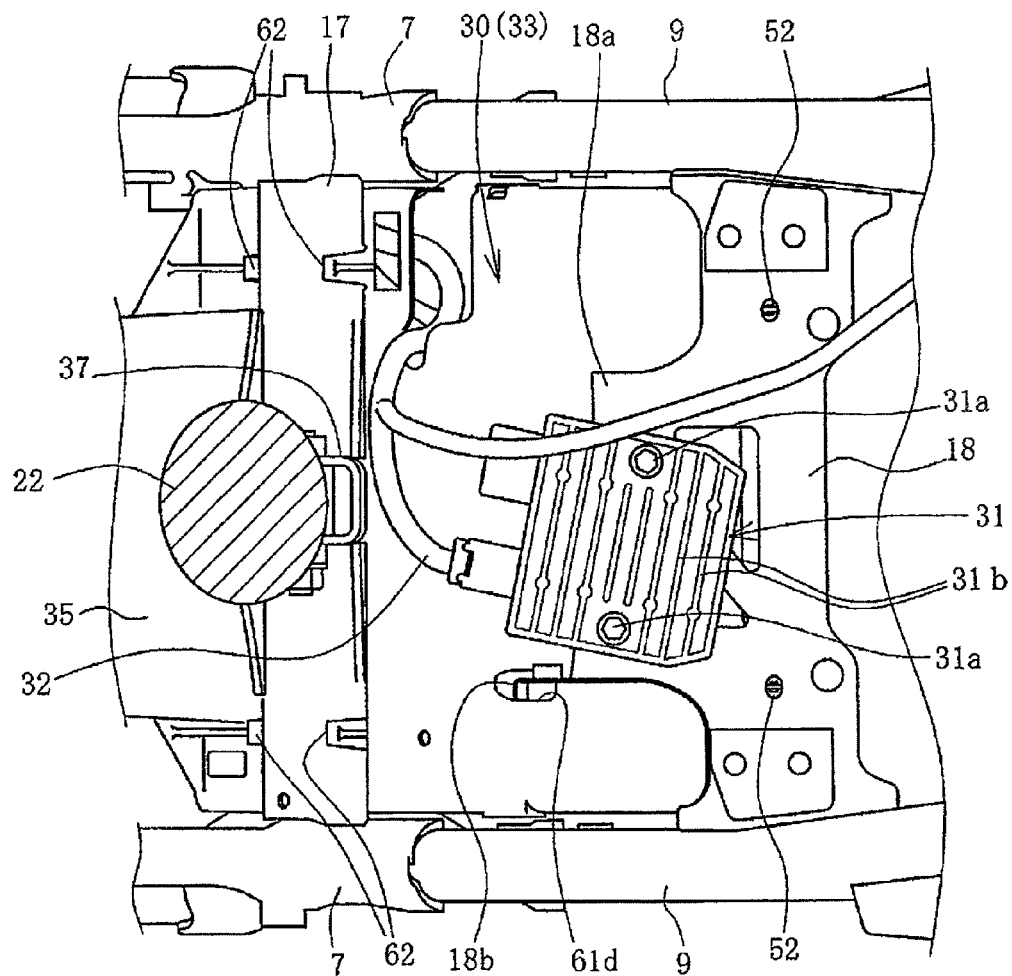
FIG. 5 is a view taken in a direction of arrow A in FIG. 2.
Figure 6:
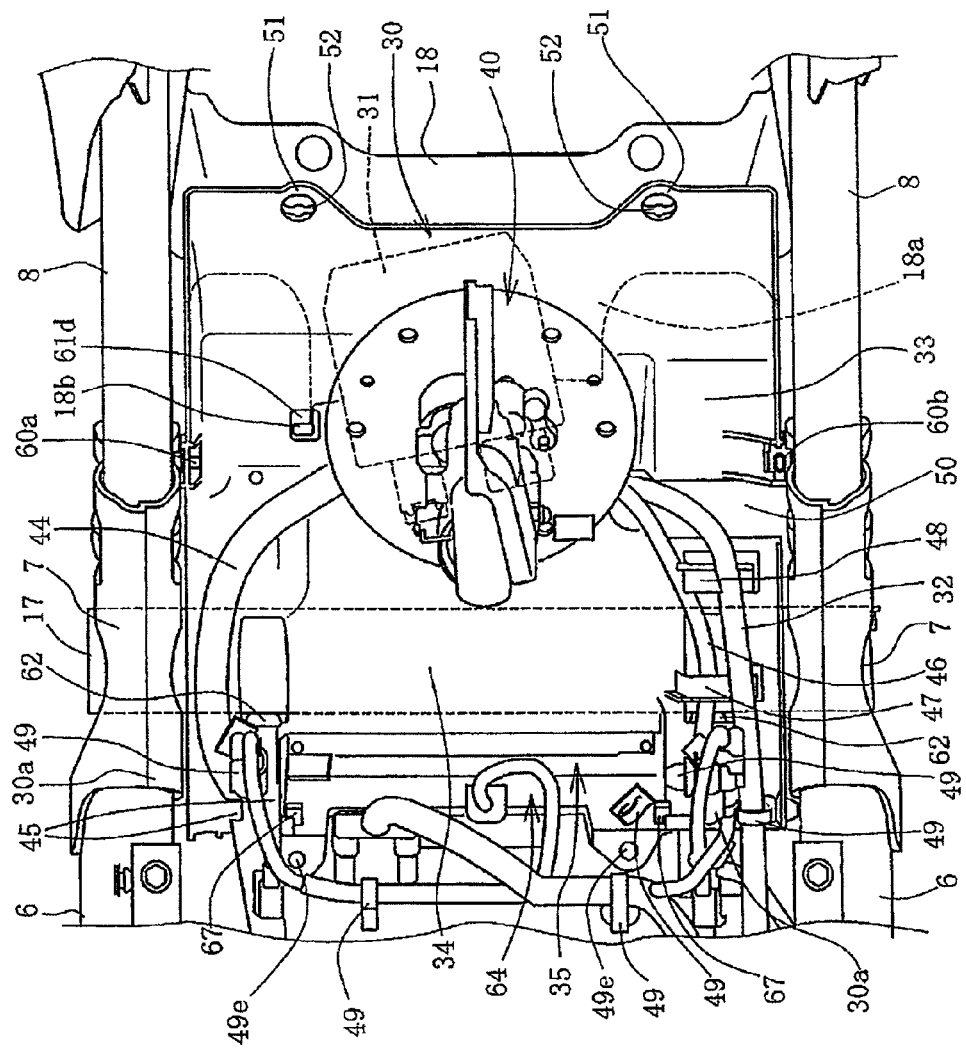
FIG. 6 is a view taken in a direction of arrow B in FIG. 4.

FIG. 2 is an enlarged side elevational view of a region in the proximity of an upper portion of the pivot frame 7, and FIG. 3 is a further enlarged side elevational view which omits the vehicle body frame shown in FIG. 2 but shows the rear fender 27 and a heat guard member in section. FIG. 4 is a sectional view taken along the center of the vehicle body showing a similar range to that of FIG. 2. FIG. 5 is a view taken in a direction of an arrow A of FIG. 2 (the rear fender is omitted), and FIG. 6 is a view taken in a direction of an arrow B of FIG. 4 (the fuel tank is omitted).

Referring to FIG. 2, a front portion of the fuel tank 25 below the seat 26 makes a large capacity portion. Particularly a front portion 25a makes a largest capacity portion and is disposed such that it extends into a region lower than the seat rails 8 in the proximity of the rear of the pivot side cross member 17 which is in the proximity of a base portion of the seat rails 8 and the back stays 9 so as to contribute to achieving a lower disposition of the vehicle's center of gravity.

The fuel tank is formed from two, upper and lower, divisional parts, which are individually formed by drawing and joined together at flange portions 53 thereof so as to be integrated with each other. At this time, the front portion 25a, which corresponds to the lower swollen portion in the conventional example, need not be downwardly swollen by such a great amount as in the conventional example because heat of a regulator 31 is blocked by a heat guard member 30. Thus, the swelling amount can be made comparatively small. Therefore, deep drawing need not be applied and production of the fuel tank 25 is facilitated.

The flange portions 53 are placed on the left and right seat rails 8 and are supported at intermediate portions thereof in the forward and backward direction by stays 54 welded to the seat rails 8.

The flange portions 53 are supported at a front end portion thereof on a bracket 56 attached to the main frames 6. A seat bracket 57 extends obliquely upwardly from a front portion of the bracket 56, and the seat 26 is supported at a front end portion thereof at an upper end of the seat bracket 57.

The rear fender 27 is a member disposed long in the forward and backward direction in order to cover the rear wheel 3 from above, and extends at a rear half portion thereof into a space between the left and right back stays 9 and is attached to the back stays 9. A regulator guard portion 28 swollen downwardly is formed integrally at a front portion of the rear fender 27.

Referring to FIG. 3, the regulator guard portion 28 forms a vessel-like recessed portion open upwardly and is attached at left and right front end upper portions thereof to the heat guard member 30 by screws 28a. Reference character 28b denotes an attaching portion to a side cover (not shown) which forms a vehicle body cover which covers a side face of the vehicle body.

The heat guard member 30 is a member which cuts off heat of the regulator 31, and the regulator 31 is disposed below the heat guard member 30. Further, the regulator guard portion 28 of the rear fender 27 is disposed below the regulator 31.

A lower portion of the regulator guard portion 28 projects downwardly farther than the back stays 9, and an aperture 29 is formed along a corner portion of the regulator guard portion 28 between a bottom portion 28c and a side face 28d opposing to the rear wheel 3.

The aperture 29 is an example of an exhaust heat path, and is long in the forward and backward direction along the profile of the corner and has a rear portion which is shaped such that it is curved so as to extend obliquely upwardly. The aperture 29 is disposed forwardly of the rear wheel 3.

If a wind in the direction indicated by an arrow mark a is generated by rotation of the rear wheel 3, then a negative pressure is formed in the proximity of the aperture 29, and the air in the inside of the regulator guard portion 28 is sucked out as indicated by an arrow mark b.

Since the air in the inside of the regulator guard portion 28 is sucked out from the aperture 29, ventilation of the inside of the regulator guard portion 28 is promoted and heat radiation of the regulator 31 (FIG. 4) accommodated in the regulator guard portion 28 can be made better thereby to raise the cooling efficiency.

Referring to FIG. 4, the regulator 31 is provided to stabilize the voltage of power generated by a generator (not shown) of the engine 4 and supply the stabilized voltage to a vehicle-carried battery (not shown) and has a nature of generating heat during use thereof. Therefore, the regulator 31 is disposed at a place at which the heat radiation is good. In the present embodiment, the regulator 31 is disposed in the regulator guard portion 28 through the heat guard member 30 below the front portion 25a of the fuel tank 25 so as to make better the heat radiation by ventilation through the aperture 29 and the upwardly open structure.

Further, the regulator 31 is protected by the regulator guard portion 28 so as not to be directly splashed with mud or water splashed by the rear wheel 3. Further, since deposition of mud or water on the regulator 31 is suppressed by the rear fender 27 including the regulator guard portion 28, the heat radiation of the regulator 31 can be maintained readily also by this.

As shown in FIGS. 4 and 5, the regulator 31 has a flat substantially rectangular outer shape and is secured to a widened portion 18a, which is provided at an intermediate portion in the leftward and rightward direction of a seat rail side cross member 18 which connects the left and right back stays 9 to each other and is swollen forwardly, by means of bolts 31a. Since the regulator 31 is attached to the seat rail side cross member 18 provided between the left and right back stays 9 in this manner, the regulator can be supported firmly by a simple configuration.

It is to be noted that, while the seat rail side cross member 18 in the present embodiment is provided between the left and right back stays 9, this is equivalent to attachment of the seat rail side cross member 18 to the left and right seat rails because the back stays 9 configure seat rails in a broad sense. Also it is possible to attach the seat rail side cross member 18 between the seat rails 8 in the narrow sense.

Further, the regulator 31 is disposed in an obliquely rearwardly upwardly inclined relationship with flat face portions disposed upwardly and downwardly as viewed in side elevation such that the area thereof exposed to the atmospheric air is made great and the traveling wind contacts with and rapidly flows rearwardly along the surface to enhance the heat radiation.

By disposing the regulator 31 in an inclined relationship in this manner, the space which appears forwardly upwardly can be utilized to dispose a discharge pipe 43 portion of a fuel pump 40 therein.

Besides, on a lower face of the regulator 31 opposing to the bottom face of the regulator guard portion 28, as shown in FIG. 5, a plurality of radiation fins 31b (only two of the radiation fins 31b are indicated by leader lines in the figure) are provided. The radiation fins 31b project in a direction substantially orthogonal to the bottom portion 28c in a spaced relationship from the bottom portion 28c of the regulator guard portion 28 (FIG. 4) such that a sufficient space is formed between the radiation fins 31b and the regulator guard portion 28 so that high heat radiation by the radiation fins 31b can be obtained.

Further, although the radiation fins 31b are directed to the rear wheel 3 side in order to enhance the heat radiation, splashing of the radiation fins 31b with mud or water is suppressed by the regulator guard portion 28.

Reference numeral 32 denotes a harness connected to electrical components such as a battery from the regulator 31.

The heat guard member 30 is a heat shield member provided for preventing an influence of heat generated by the regulator 31 during use thereof from impinging on the front portion 25a of the fuel tank 25, particularly a bottom part 25b thereof which is provided directly above the regulator. The heat guard member 30 is disposed between the regulator 31 and the bottom part 25b of the front portion 25a of the fuel tank 25 and projects forwardly along the forwardly downward inclination of the regulator 31.

The heat guard member 30 is made of a resin and includes a swollen portion 33 which covers the bottom part 25b of the front portion of the fuel tank from below and projects downward above the regulator 31, a bridge portion 34 extending forwardly farther than the fuel pump 40 and engaged with the pivot side cross member 17, and a forward extension 30a provided forwardly across the bridge portion 34. An electrical part accommodation section 35 is provided integrally on the forward extension 30a such that it projects downwardly. The electrical part accommodation section 35 has a form of a box which is open upwardly and projects downwardly, and an ECU 36 which is an example of an electrical component is accommodated in the electrical part accommodation section 35.

Since the electrical part accommodation section 35 is provided on the heat guard member 30 such that it projects downwardly and the ECU 36 is accommodated in the electrical part accommodation section 35 in this manner, further lower disposition of the vehicle's center of gravity, further concentration of the vehicle's mass and further reduction of the number of parts can be realized. It is to be noted that it is arbitrarily possible to accommodate not the ECU 36 but some other electrical component in the electrical part accommodation section 35.

The bridge portion 34 is a portion which connects an upper portion of the swollen portion 33 and the forward extension 30a, which is an upper portion of the electrical part accommodation section 35, forwardly and backwardly. By placing this portion on the pivot side cross member 17, the bridge portion 34 is locked to the pivot side cross member 17 by a locking pawl 62 (refer to FIG. 3). Further, a rear end portion 51 of the heat guard member 30 extends rearwardly farther than a rear end portion of the regulator 31 and is attached to the seat rail side cross member 18 by a fastener member 52.

By the configuration described, the heat guard member 30 can be attached to the pivot side cross member 17 and the seat rail side cross member 18 by a simple configuration, and the fuel pump 40 and the regulator 31 and cushion unit 22 can be disposed in relatively close proximity of each other across the heat guard member 30. Therefore, concentration of the vehicle's mass by disposition of the parts in the proximity of each other can be realized.

It is to be noted that details of the heat guard member 30 are hereinafter described.

Referring to FIG. 4, a bracket 37 is provided at an intermediate portion in the leftward and rightward direction of the pivot side cross member 17, and an upper attaching portion 22a provided at an upper end portion of the cushion unit 22 is pivotally mounted on the bracket 37. A portion of the bottom part 25b covered with the swollen portion 33 has a flat recessed portion, to which an attachment base 41 of the fuel pump 40 is attached by a nut 42.

The discharge pipe 43 extends downwardly of the bottom part 25b from the attachment base 41 and is connected to a feed hose 44. Reference numeral 46 denotes a power supply cable for supplying the fuel pump 40 with power. The attachment base 41 and the discharge pipe 43 as well as the feed hose 44 and the power supply cable 46 are partly accommodated in the inside of the swollen portion 33. The discharge pipe 43 is a fuel discharge port of the fuel pump 40. Further, the feed hose 44 is an example of a fuel hose. The feed hose 44 is piped forwardly passing between the bottom part 25b and the heat guard member 30 and supplies fuel to the throttle body 14 (refer to FIG. 1).

As shown in FIG. 6, the fuel pump 40 is positioned at the swollen portion 33. The regulator 31 is disposed below the swollen portion 33.

By disposing the regulator 31 below the fuel pump 40 positioned at a lower portion of the front portion 25a of the fuel tank 25, lower disposition of the vehicle's center of gravity can be realized, and an influence of heat of the regulator 31 on the fuel pump 40 can be suppressed by the heat guard member 30.

From the fuel pump 40, the feed hose 44 is piped to the right side in the swollen portion 33, and the feed hose 44 extends forwardly across a location above a right side end portion of the pivot side cross member 17 and is locked and guided at an intermediate portion thereof by a hose guide 45 provided on the right side which is one side in the vehicle widthwise direction of an upper face of the forward extension 30a on the front side of the pivot side cross member 17. The hose guide 45 is configured from a vertical wall of an arcuate shape and a projecting portion projecting toward the vertical wall (refer to FIG. 7). Since the hose guide 45 is provided on one side in the vehicle widthwise direction of an upper face of the forward extension 30a in this manner, the feed hose 44 can be properly piped while being guided to the prescribed position even if the space is narrow.

The harness 32 and the power supply cable 46 are both disposed to the left side in the swollen portion 33 and extend forwardly past a location above a left side end portion of the pivot side cross member 17. At this time, the harness 32 and the power supply cable 46 are supported by a harness guide portion 47 formed at a left end portion of the bridge portion 34 placed on the pivot side cross member 17 and another harness guide portion 48 formed at a front end portion of the harness 32 in a slightly spaced relationship rearwardly from the harness guide portion 47. The harness 32 and the power supply cable 46 are also supported/secured by a plurality of harness clampers 49.

The harness guide portions 47 and 48 are provided on the left side in the widthwise direction of the upper face of the heat guard member 30 which is the opposite side to the side on which the hose guide 45 is provided.

Since the harness guide portions 47 and 48 are provided on the upper face of the forward extension 30a on the opposite side to the hose guide 45 in this manner, the feed hose 44 and the harness 32 can be properly piped and wired separately from each other even if the space is narrow.

The harness 32 extends from the regulator 31 disposed below the swollen portion 33 and extends from the regulator 31 into the swollen portion 33 through a cutout portion 50 cut in a direction toward the center of the vehicle body from the left side in the bottom portion of the swollen portion 33 formed in the proximity of the harness guide portion 48. The cutout portion 50 is provided such that the harness 32 can be wired to the regulator 31 side on the outer side in the vehicle widthwise direction and forwardly with respect to the regulator 31 of the heat guard member 30. Where the cutout portion 50 is provided in this manner, while a heat shielding effect of the regulator 31 is assured, the harness 32 can be properly wired to the regulator 31 side.

Figure 7:
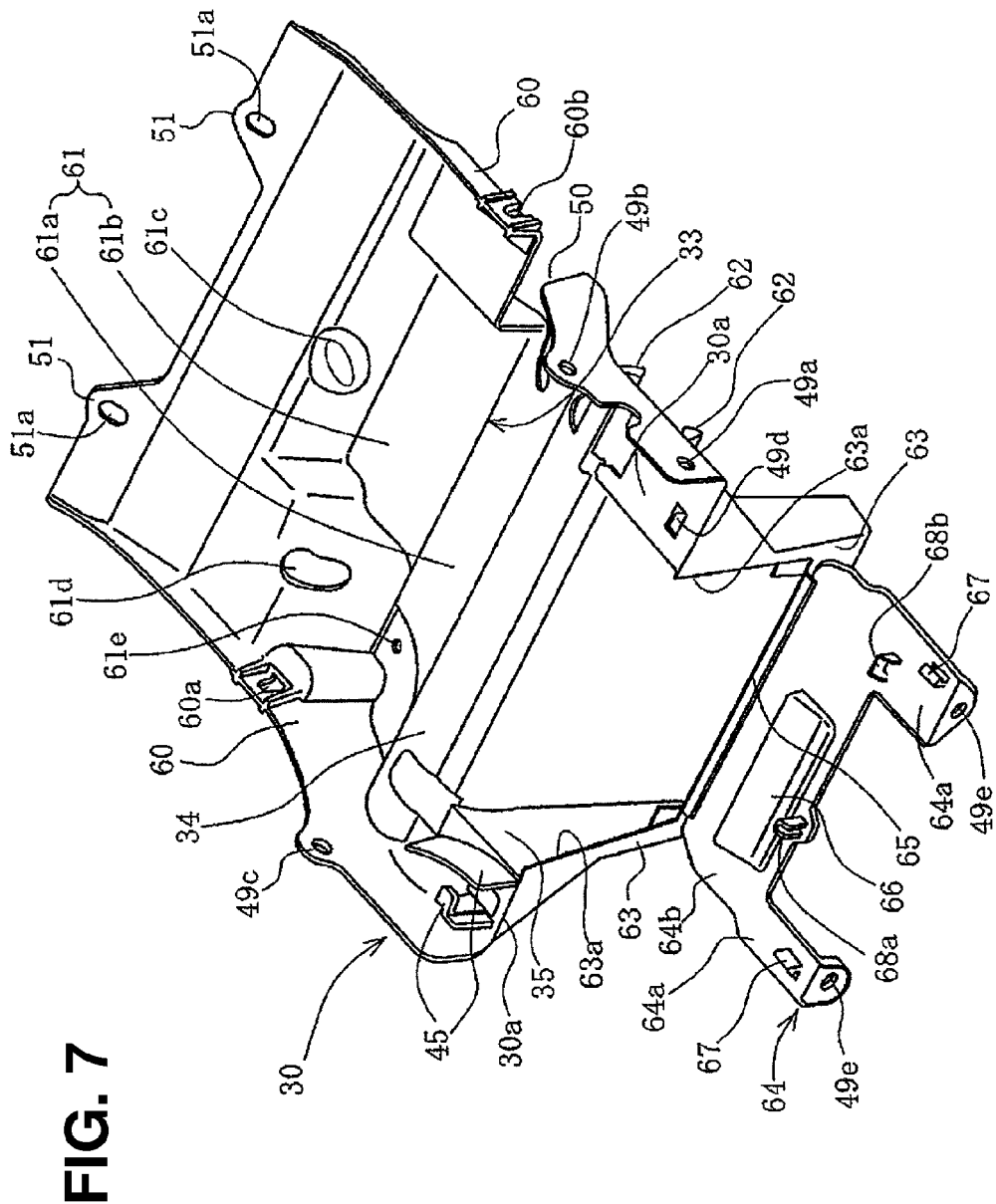
FIG. 7 is a perspective view of a heat guard member of the motorcycle of FIG. 1.
Figure 8:
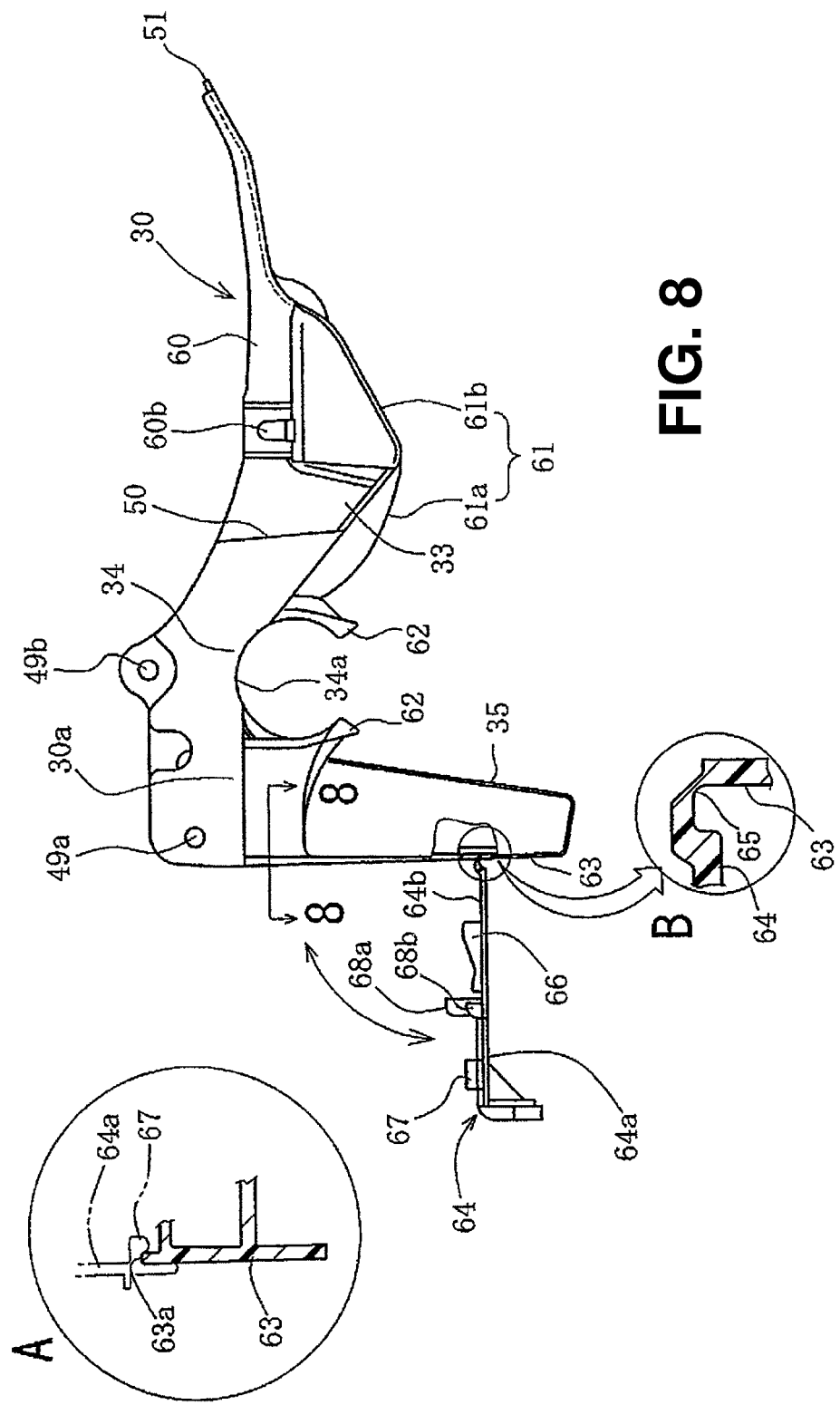
FIG. 8 is a side elevational view of the heat guard member.
Figure 9:
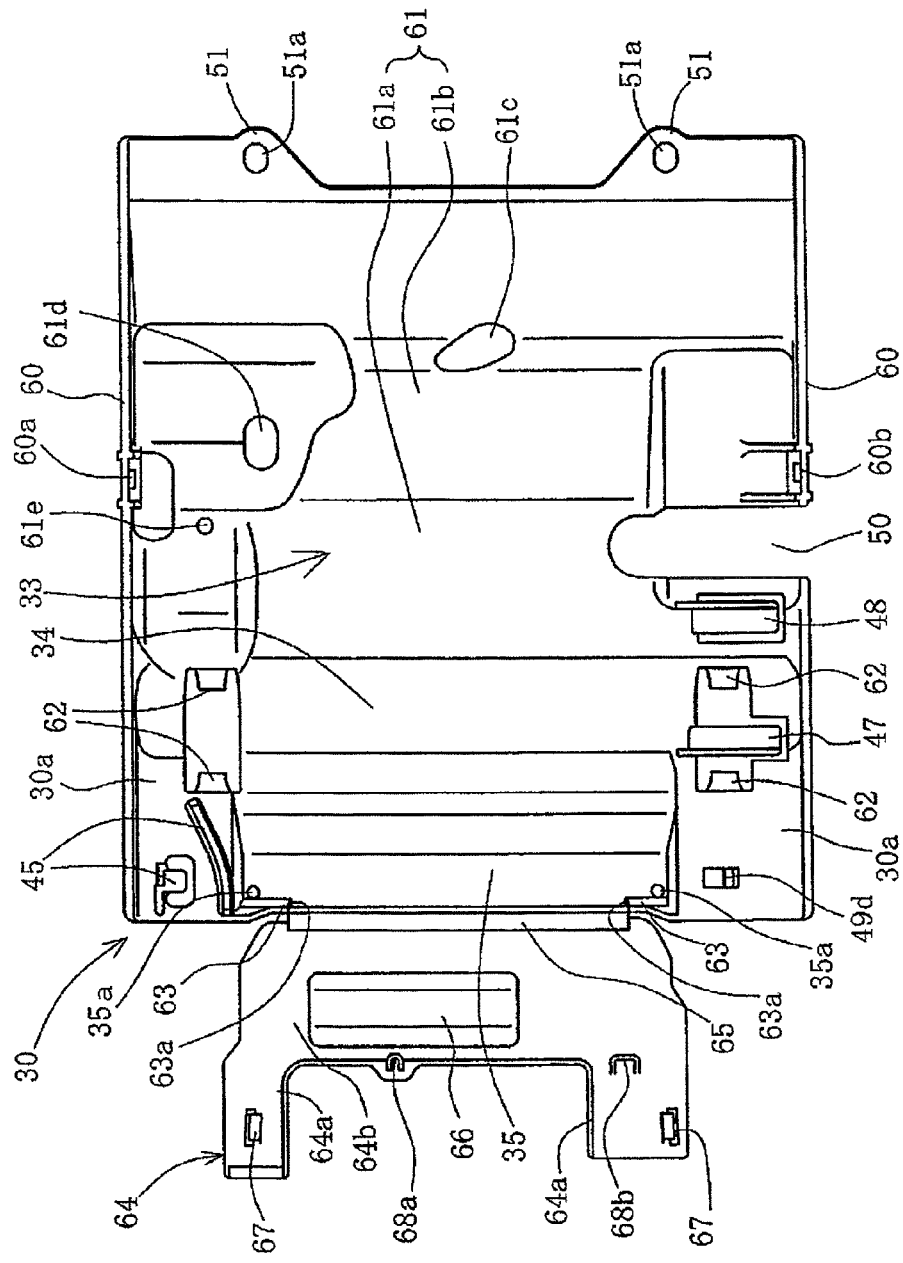
FIG. 9 is a plan view of the heat guard member.

Now, details of the heat guard member 30 are described with reference to FIGS. 7 to 9. FIG. 7 is a perspective view thereof as viewed from an obliquely left upwardly forward direction, FIG. 8 is a side elevational view thereof, and FIG. 9 is a plan view thereof.

The heat guard member 30 has a substantially rectangular shape as viewed in plan (FIG. 9) and has a form of a vessel surrounded by left and right side walls 60 and a bottom wall 61 of a substantially V shape as viewed in side elevation and open upwardly.

At an intermediate portion in the forward and rearward direction of the left and right side walls 60, attaching portions 60a and 60b for attaching a front end upper portion of the regulator guard portion 28 by means of screws 28a (FIG. 2) are provided. The left side attaching portion 60b is formed as an elongated hole.

The bottom wall 61 of the swollen portion 33 has a substantially V shape formed from a front side inclined face 61a and a rear side inclined face 61b as viewed in side elevation (FIG. 8), and end portions of the discharge pipe 43 and the feed hose 44 are accommodated utilizing this V-shaped deep space. The regulator 31 is disposed in an inclined relationship along the lower face of the rear side inclined face 61b of the bottom wall 61 (FIG. 4).

The rear side inclined face 61b extends obliquely upwardly rearwards, and an attachment hole 51a for letting the fastener member 52 pass therethrough is provided at a rear end portion 51 of the rear side inclined face 61b.

A recessed portion 61c which avoids the discharge pipe 43 is provided centrally of a rear portion of the rear side inclined face 61b.

Further, an escapement hole 61d for permitting penetration by a stay 18b (FIG. 5) formed in a projecting manner on the widened portion 18a is formed on the right side of the rear side inclined face 61b.

A drain hole 61e is formed on the right side of a lowest bottom portion of the bottom wall 61 so that water entering the swollen portion 33 can be discharged downwardly (FIG. 7).

A drain hole 35a is formed also on the left and the right of the bottom portion of the electrical part accommodation section 35 (FIG. 9) so that water entering the electrical part accommodation section 35 can be discharged downwardly.

The lower face side of the bridge portion 34 forms a recessed groove 34a which is depressed upwardly and extends in the leftward and rightward direction between the swollen portion 33 and the electrical part accommodation section 35, and the pivot side cross member 17 is accommodated in the recessed groove 34a. The locking pawl 62 of a substantially C shape as viewed in side elevation is formed integrally on left and right lower faces of the bridge portion 34 so as to project into the recessed groove 34a from the front and the rear. Accordingly, if the bridge portion 34 is placed on the pivot side cross member 17 and then pushed firmly downwardly, then the locking pawls 62 are engaged with the periphery of the pivot side cross member 17 in a state in which the pivot side cross member 17 enters between the front and rear locking pawls 62. Consequently, the bridge portion 34 is locked to the pivot side cross member 17.

A lid 64 for opening and closing motion is formed on a front wall 63 of the electrical part accommodation section 35 by partially cutting the left and right of the front wall 63 downwardly from above.

The lid 64 is connected at a base end portion thereof to the front wall 63 by a resin hinge section 65 (refer to a B portion surrounded by a circle in FIG. 8) such that the lid 64 can be opened and closed around the resin hinge section 65. The lid 64 is formed integrally with the heat guard member 30.

The lid 64 has left and right portions which form upwardly projecting arm portions 64a (FIG. 9) and has a main body portion 64b connected at the left and right thereof to base portions of the left and right arm portions 64a.

A projection 66 is formed integrally on the main body portion 64b such that it is swollen inwardly of the electrical part accommodation section 35 when the lid 64 is closed. When the lid 64 is closed, the projection 66 presses against the ECU 36 so that the ECU 36 can be securely fixed in the electrical part accommodation section 35. Further, since the projection 66 forms a recessed portion which is open forwardly when the lid 64 is closed, it is a portion also for allowing the lid 64 to be touched readily when a coupler (not shown) of the ECU 36 is to be accessed.

It is to be noted that a protrusion 68a is provided also at an intermediate portion in the leftward and rightward direction of an open side edge portion of the main body portion 64b, and a protrusion 68b is provided also at a base portion of the left side arm portion 64a in a sidewardly juxtaposed relationship with the protrusion 68a. The protrusion 68a is longer than the protrusion 68b, and when the lid 64 is closed, both of the protrusion 68a and the protrusion 68b press against the ECU 36 for securely fixing, together with the projection 66, the ECU in the electrical part accommodation section 35.

A pawl 67 serving as a lid side locking portion is formed integrally in a projecting manner on each of the left and right arm portions 64a. When the lid 64 is closed, the pawls 67 are engaged with edge portions 63a of the front wall 63 positioned on the opposite sides of the lid 64 to keep the closed state of the lid 64 (refer to a portion A surrounded by a circle in FIG. 8). The projection 66, protrusions 68a and 68b and pawls 67 are formed integrally on the lid 64.

Since the lid 64 for opening and closing movement is provided integrally on the front wall 63 of the electrical part accommodation section 35 through the resin hinge section 65 in this manner, even if the electrical part accommodation section 35 is formed by deep drawing, it can be shaped integrally with the heat guard member 30. Besides, since the projection 66 and the protrusions 68a and 68b for pressing the ECU 36 (electrical component) are provided on the lid 64, the electrical component can be held down accurately only by one part (the lid).

Attachment holes 49a, 49b and 49c for the harness clampers 49 are formed at a front portion of the side walls 60. Further, the left and right of an upper portion of the electrical part accommodation section 35 form flange portions continuing from the bridge portion 34, and an attachment hole 49d for the harness clamper 49 is formed also in the flange portions.

Further, an upper end portion of the arm portion 64a forms a flange, and an attachment hole 49e for the harness clamper 49 is formed also in the flange (FIG. 7).

It is to be noted that the invention of the present application is not limited to the exemplary embodiment described above, and for example, the vehicle to which the present invention is applied is not limited to a motorcycle but may be any other saddle type vehicle such as buggy.

DESCRIPTION OF THE REFERENCE SYMBOLS

1: Vehicle body frame, 6: Main frame, 7: Pivot frame, 8: Seat rail, 9: Back stay (part of seat rail), 17: Pivot side cross member, 18: Seat rail side cross member, 22: Cushion unit, 25: Fuel tank, 26: Seat, 27: Rear fender, 28: Regulator guard portion, 30: Heat guard member, 30a: Forward extension, 31: Regulator, 33: Swollen portion, 34: Bridge portion (cross member side attachment portion), 35: Electrical part accommodation section, 36: ECU (electrical component), 40: Fuel pump, 64: Lid, 65: Resin hinge section, 67: Pawl (lid side locking portion).

We claim:

1. A saddle type vehicle comprising:
a vehicle body frame with an engine and a seat supported on said vehicle body frame;
a fuel tank disposed below said seat for storing fuel for said engine;
a fuel pump disposed at a lower portion of said fuel tank for supplying the fuel to said engine;
a regulator disposed below said fuel tank;
a heat guard member disposed between said regulator and said fuel pump for blocking heat transfer; and
a rear fender disposed below said regulator; wherein:
said vehicle body frame includes a pair of left and right seat rails extending obliquely upwardly rearwards for supporting said seat thereon;
a seat rail side cross member is provided between said left and right seat rails;
said regulator is attached to said seat rail side cross member and disposed in an inclined relationship along said seat rails as viewed in side elevation;
said heat guard member includes a swollen portion projecting downwardly toward said regulator, a bottom portion of said swollen portion is formed so as to extend along the inclination of said regulator and partly project forwardly; and
a discharge port of said fuel pump is disposed in said swollen portion.

2. The saddle type vehicle according to claim 1, wherein an exhaust heat path aperture is provided in said rear fender so as to face on a rear portion side of said regulator; and said exhaust heat path aperture is disposed forwardly of a rear wheel.

3. The saddle type vehicle according to claim 1, wherein said fuel pump is connected to a fuel hose for supplying fuel to said engine; and
a hose guide portion for guiding said fuel hose is provided on an upper face of said heat guard member.

4. The saddle type vehicle according to claim 3, wherein said hose guide portion is disposed on one side in a vehicle widthwise direction of the upper face of said heat guard member; and
a harness guide portion for guiding wiring of a harness connected to said regulator is provided on the other side in the vehicle widthwise direction of the upper face of said heat guard member.

5. The saddle type vehicle according to claim 4, wherein a cutout portion through which the wiring of said harness extends to said regulator is provided on said heat guard member on the outer side in the vehicle widthwise direction with respect to and forwardly of said regulator.

6. The saddle type vehicle according to claim 1, wherein said heat guard member is formed of resin.

7. The saddle type vehicle according to claim 1, wherein said fuel tank is disposed inclined obliquely upwardly substantially along seat rails of said body frame and has a rear end portion disposed rearwardly of the seat above a rear wheel of the vehicle.

8. The saddle type vehicle according to claim 1, wherein said rear fender includes at a front end thereof a regulator guard portion swollen downwardly and disposed below said regulator.

9. A saddle type vehicle comprising:
a vehicle body frame with an engine and a seat supported on said vehicle body frame;
a fuel tank disposed below said seat for storing fuel for said engine;

a fuel pump disposed at a lower portion of said fuel tank for supplying the fuel to said engine;

a regulator disposed below said fuel tank;

a heat guard member disposed between said regulator and said fuel pump for blocking heat transfer; and a rear fender disposed below said regulator;

wherein said saddle type vehicle supports a rear wheel for rotation at a rear portion thereof and further includes a rear swing arm supported for rocking motion on said vehicle body frame and a cushion unit for connecting said rear swing arm and said vehicle body frame to each other;

said vehicle body frame including a pair of left and right pivot frames and a pivot side cross member connecting said left and right pivot frames to each other;

an upper attachment portion of said cushion unit is provided on said pivot side cross member;

said heat guard member extends forwardly farther than said fuel pump, and a cross member side attachment portion engaged with said pivot side cross member is provided on said heat guard member.

10. The saddle type vehicle according to claim 9, wherein said cross member side attachment portion is formed as a recess on a lower surface of said heat guard member and is snap-fitted onto said pivot side cross member.

11. The saddle type vehicle according to claim 9, wherein said head guard member includes a forward extension extending forwardly farther than said cross member side attachment portion; and an electrical component accommodation section which projects downwardly and has an electrical component accommodated therein is provided on said forward extension (30a).

12. The saddle type vehicle according to claim 11, wherein part of a front wall of said electrical component accommodation section forms a lid for opening and closing movement through a resin hinge section, while a projection for holding down said electrical component and a lid side locking portion for locking an edge portion of said front wall are positioned on the opposite sides of said lid and are integrally formed on said lid.

* * * * *